United States Patent
Ghazel et al.

(10) Patent No.: US 11,080,566 B2
(45) Date of Patent: Aug. 3, 2021

(54) METHOD, SYSTEM AND APPARATUS FOR GAP DETECTION IN SUPPORT STRUCTURES WITH PEG REGIONS

(71) Applicant: ZEBRA TECHNOLOGIES CORPORATION, Lincolnshire, IL (US)

(72) Inventors: Mohsen Ghazel, Mississauga (CA); Joseph Lam, North York (CA); Qifeng Gan, Oakville (CA); Kiril Lomakin, Toronto (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 88 days.

(21) Appl. No.: 16/429,687

(22) Filed: Jun. 3, 2019

(65) Prior Publication Data
US 2020/0380317 A1     Dec. 3, 2020

(51) Int. Cl.
  *G06K 9/00* (2006.01)
  *G06K 9/62* (2006.01)
  *G06T 7/50* (2017.01)
  *G06T 7/73* (2017.01)

(52) U.S. Cl.
  CPC .............. *G06K 9/6284* (2013.01); *G06T 7/50* (2017.01); *G06T 7/74* (2017.01); *G06T 2207/10028* (2013.01)

(58) Field of Classification Search
  None
  See application file for complete search history.

(56) References Cited

U.S. PATENT DOCUMENTS

| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |
| 5,534,762 A | 7/1996 | Kim |

(Continued)

FOREIGN PATENT DOCUMENTS

| CA | 2835830 | 11/2012 |
| CA | 3028156 | 1/2018 |

(Continued)

OTHER PUBLICATIONS

"Fair Billing with Automatic Dimensioning" pp. 1-4, undated, Copyright Mettler-Toledo International Inc.

(Continued)

*Primary Examiner* — Wei Wen Yang

(57) ABSTRACT

A method of detecting gaps on a support structure includes: obtaining, at an imaging controller, (i) a plurality of depth measurements representing the support structure according to a common frame of reference, and (ii) a plurality of label indicators each defining a label position in the common frame of reference; for each of the label indicators: classifying the label indicator as either a peg label or a shelf label, based on a portion of the depth measurements selected according to the label position and a portion of the depth measurements adjacent to the label position; generating an item search space in the common frame of reference according to the class of the label indicator; and determining, based on a subset of the depth measurements within the item search space, whether the item search space contains an item.

20 Claims, 12 Drawing Sheets

(56) References Cited

U.S. PATENT DOCUMENTS

| | | |
|---|---|---|
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |

(56) References Cited

U.S. PATENT DOCUMENTS

| | | |
|---|---|---|
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |

(56) References Cited

U.S. PATENT DOCUMENTS

| | | |
|---|---|---|
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1* | 6/2017 | Graham .......... G06Q 10/087 |
| 2017/0178310 A1* | 6/2017 | Gormish .......... G06K 9/6267 |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108134 A1 | 4/2018 | Venable et al. |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1* | 11/2018 | Phan .................. G06K 9/4642 |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0178436 A1 | 6/2019 | Mao et al. |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |
| 2020/0314333 A1 | 10/2020 | Liang et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| JP | 2014170431 | 9/2014 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |

(56) References Cited

FOREIGN PATENT DOCUMENTS

| WO | WO 2012103202 | 8/2012 |
|---|---|---|
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM p. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

Dubois, M., et al., A comparison of geometric and energy-based point cloud semantic segmentation methods, European Conference on Mobile Robots (ECMR), p. 88-93, Sep. 25-27, 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Notice of allowance for U.S. Appl. No. 15/211,103 dated Apr. 5, 2017.

Olson, Clark F., etal. "Wide-Baseline Stereo Vision for terrain Mapping" in Machine Vision and Applications, Aug. 2010. (2010) 21: 713-725.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environments", IEEE/RSJ International Conference on Intelligent robots and Systems, Nov. 2013, pp. 176-181.

Park et al., "Autonomous mobile robot navigation using passive rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2n10, Oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

Puwein, J., et al."Robust Multi-view camera calibration for wide-baseline camera networks," In IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php.

Rusu, et al. "Spatial Change detection on unorganized point cloud data," PCL Library, retrieved from internet on Aug. 19, 2016 [http://pointclouds.org/documentation/tutorials/octree_change.php].

Schnabel et al. "Efficient RANSAC for Point-Cloud Shape Detection", vol. 0, No. 0, pp. 1-12 (1981).

Senthilkumaran, et al., "Edge Detection Techniques for Image Segmentation—A Survey of Soft Computing Approaches", International Journal of Recent Trends in Engineering, vol. 1, No. 2 (May 2009).

Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].

Tahir, Rabbani, et al., "Segmentation of point clouds using smoothness constraint,"International Archives of Photogrammetry, Remote Sensing and Spatial Information Sciences 36.5 (Sep. 2006): 248-253.

Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.

Tseng, et al., "A Cloud Removal Approach for Aerial Image Visualization", International Journal of Innovative Computing, Information & Control, vol. 9, No. 6, pp. 2421-2440 (Jun. 2013).

Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).

United Kingdom Intellectual Property Office, "Combined Search and Examination Report" for GB Patent Application No. 1813580.6 dated Feb. 21, 2019.

United Kingdom Intellectual Property Office, Combined Search and Examination Report dated Jan. 22, 2016 for GB Patent Application No. 1417218.3.

United Kingdom Intellectual Property Office, Combined Search and Examination Report dated Jan. 22, 2016 for GB Patent Application No. 1521272.3.

(56) References Cited

OTHER PUBLICATIONS

United Kingdom Intellectual Property Office, Combined Search and Examination Report dated Mar. 11, 2015 for GB Patent Application No. 1417218.3.

United Kingdom Intellectual Property Office, Combined Search and Examination Report dated May 13, 2020 for GB Patent Application No. 1917864.9.

Varol Gul et al: "Product placement detection based on image processing", 2014 22nd Signal Processing and Communication Applications Conference (SIU), IEEE, Apr. 23, 2014.

Varol Gul et al: "Toward Retail product recognition on Grocery shelves", Visual Communications and image processing; Jan. 20, 2004; San Jose, (Mar. 3, 2015).

Weber et al., "Methods for Feature Detection in Point clouds," visualization of large and unstructured data sets—IRTG Workshop, pp. 90-99 (2010).

Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).

Ziang Xie et al., "Multimodal Blending for High-Accuracy Instance Recognition", 2013 IEEE RSJ International Conference on Intelligent Robots and Systems, p. 2214-2221.

Fan Zhang et al., "Parallax-tolerant Image Stitching", 2014 Computer Vision Foundation, pp. 4321-4328.

Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].

Julio Zaragoza et al., "As-Projective-As-Possible Image Stitching with Moving DLT", 2013 Computer Vision Foundation, pp. 2339-2346.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, v191, pp. 148-160 (2016).

Hu et al., "An improved method of discrete point cloud filtering based on complex environment," International Journal of Applied Mathematics and Statistics, v48, i18 (2013).

International Search Report and Written Opinion for corresponding International Patent Application No. PCT/US2016/064110 dated Mar. 20, 2017.

International Search Report and Written Opinion for corresponding International Patent Application No. PCT/US2017/024847 dated Jul. 7, 2017.

International Search Report and Written Opinion for International Application No. PCT/US2019/025859 dated Jul. 3, 2019.

International Search Report and Written Opinion for International Application No. PCT/US2018/030419 dated Aug. 31, 2018.

International Search Report and Written Opinion from International Patent Application No. PCT/US2018/030345 dated Sep. 17, 2018.

International Search Report and Written Opinion from International Patent Application No. PCT/US2018/030360 dated Jul. 9, 2018.

International Search Report and Written Opinion from International Patent Application No. PCT/US2018/030363 dated Jul. 9, 2018.

International Search Report and Written Opinion from International Patent Application No. PCT/US2019/025849 dated Jul. 9, 2019.

International Search Report and Written Opinion from International Patent Application No. PCT/US2019/064020 dated Feb. 19, 2020.

International Search Report and Written Opinion for International Patent Application No. PCT/US2013/053212 dated Dec. 1, 2014.

International Search Report and Written Opinion for International Patent Application No. PCT/US2013/070996 dated Apr. 2, 2014.

International Search Report and Written Opinion for International Patent Application No. PCT/US2020/028133 dated Jul. 24, 2020.

International Search Report and Written Opinion from International Patent Application No. PCT/US2020/029134 dated Jul. 27, 2020.

International Search Report and Written Opinion from International Patent Application No. PCT/US2020/028183 dated Jul. 24, 2020.

International Search Report and Written Opinion from International Patent Application No. PCT/US2020/035285 dated Aug. 27, 2020.

Jadhav et al. "Survey on Spatial Domain dynamic template matching technique for scanning linear barcode," International Journal of science and research v 5 n 3, Mar. 2016)(Year: 2016).

Jian Fan et al: "Shelf detection via vanishing point and radial projection", 2014 IEEE International Conference on image processing (ICIP), IEEE, (Oct. 27, 2014), pp. 1575-1578.

Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, No. 4, ACM, pp. 269-278, 1986.

Kelly et al., "Reactive Nonholonomic Trajectory Generation via Parametric Optimal Control", International Journal of Robotics Research, vol. 22, No. 7-8, pp. 583-601 (Jul. 30, 2013).

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31 2011, Calgary, Canada.

Lecking et al: "Localization in a wide range of industrial environments using relative 3D ceiling features", IEEE, pp. 333-337 (Sep. 15, 2008).

Lee et al. "Statistically Optimized Sampling for Distributed Ray Tracing." ACM SIGGRAPH Computer Graphics, vol. 19, No. 3, ACM, pp. 61-67, 1985.

Li et al., "An improved RANSAC for 3D Point cloud plane segmentation based on normal distribution transformation cells," Remote sensing, V9: 433, pp. 1-16 (2017).

Likhachev, Maxim, and Dave Ferguson. "Planning Long dynamically feasible maneuvers for autonomous vehicles." The international journal of Robotics Reasearch 28.8 (2009): 933-945. (Year:2009).

Marder-Eppstein et al., "The Office Marathon: robust navigation in an indoor office environment," IEEE, 2010 International conference on robotics and automation, May 3-7, 2010, pp. 300-307.

McNaughton, Matthew, et al. "Motion planning for autonomous driving with a conformal spatiotemporal lattice." Robotics and Automation (ICRA), 2011 IEEE International Conference on. IEEE, 2011. (Year: 2011).

Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 I9, pp. 1-20 (2016).

Norriof et al., "Experimental comparison of some classical iterative learning control algorithms", IEEE Transactions on Robotics and Automation, Jun. 2002, pp. 636-641.

Notice of allowance for U.S. Appl. No. 13/568,175 dated Sep. 23, 2014.

Notice of allowance for U.S. Appl. No. 13/693,503 dated Mar. 11, 2016.

Notice of allowance for U.S. Appl. No. 14/068,495 dated Apr. 25, 2016.

(56) References Cited

OTHER PUBLICATIONS

Notice of allowance for U.S. Appl. No. 14/518,091 dated Apr. 12, 2017.

* cited by examiner

METHOD, SYSTEM AND APPARATUS FOR GAP DETECTION IN SUPPORT STRUCTURES WITH PEG REGIONS

BACKGROUND

Environments in which objects are managed, such as retail facilities, warehousing and distribution facilities, and the like, may store such objects in regions such as aisles of support structures (e.g. shelf modules). For example, a retail facility may include objects such as products for purchase, and a distribution facility may include objects such as parcels or pallets. A mobile automation apparatus may be deployed within such facilities to perform tasks at various locations. For example, a mobile automation apparatus may be deployed to capture data representing an aisle in a retail facility for use in identifying product status information. The support structures in the facility may have varying structural features, however, which may reduce the accuracy of product status determination.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
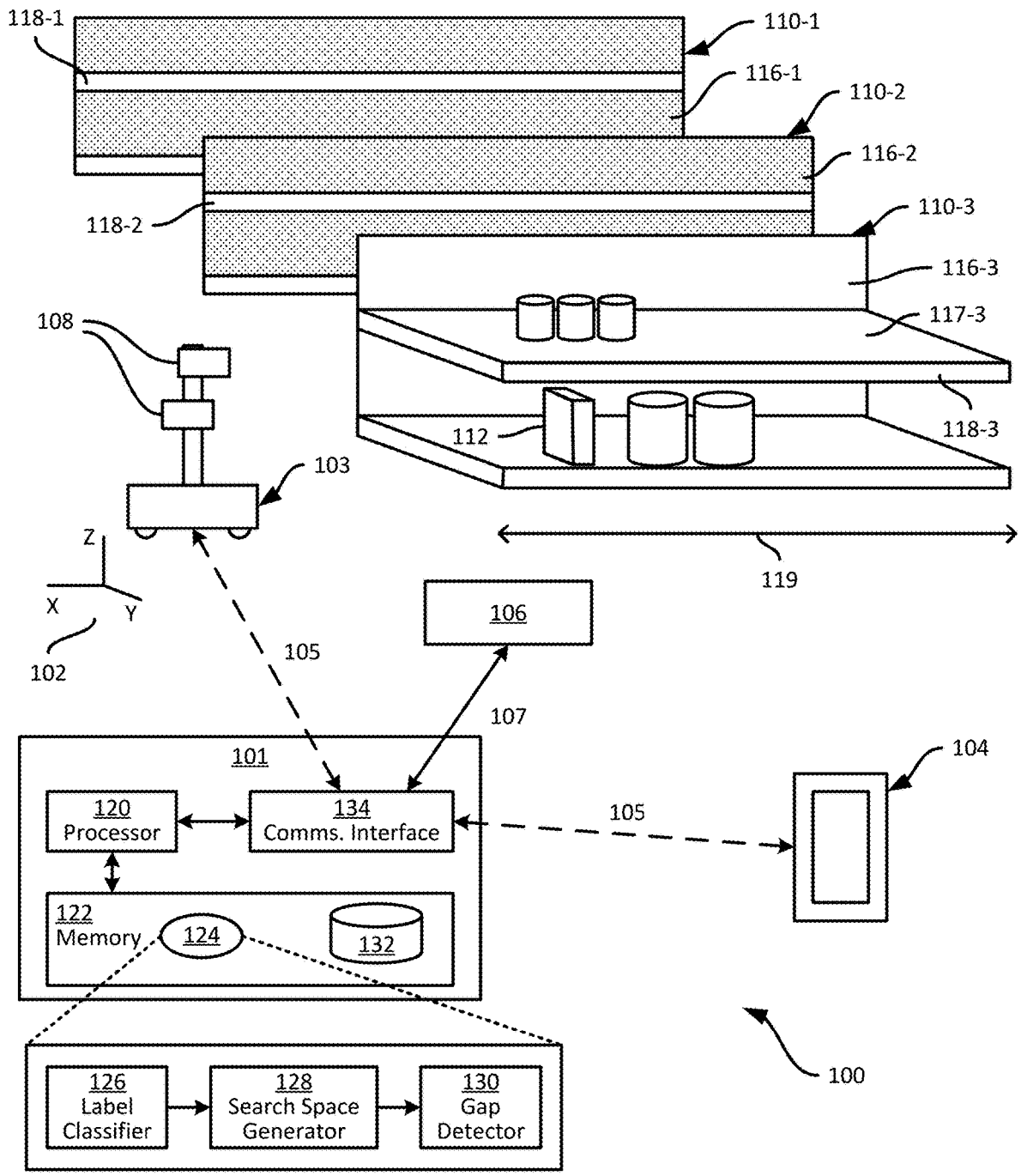
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of detecting gaps on a support structure, the method comprising: obtaining, at an imaging controller, (i) a plurality of depth measurements representing the support structure according to a common frame of reference, and (ii) a plurality of label indicators each defining a label position in the common frame of reference; for each of the label indicators: classifying the label indicator as either a peg label or a shelf label, based on a portion of the depth measurements selected according to the label position and a portion of the depth measurements adjacent to the label position; generating an item search space in the common frame of reference according to the class of the label indicator; and determining, based on a subset of the depth measurements within the item search space, whether the item search space contains an item.

Additional examples disclosed herein are directed to a computing device comprising: a memory storing (i) a plurality of depth measurements representing a support structure according to a common frame of reference, and (ii) a plurality of label indicators each defining a label position in the common frame of reference; an imaging controller configured, for each of the label indicators, to: classify the label indicator as either a peg label or a shelf label, based on a portion of the depth measurements selected according to the label position and a portion of the depth measurements adjacent to the label position; generate an item search space in the common frame of reference according to the class of the label indicator; and determine, based on a subset of the depth measurements within the item search space, whether the item search space contains an item.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of items, also referred to herein as products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. As will be discussed below, the shelf modules 110 can also include areas in which the products 112 are supported on pegs extending from the shelf back 116 rather than support surfaces 117.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is also specifically designed, as will be discussed in detail herein, to process image data and depth measurements captured by the apparatus 103 representing the shelf modules 110, in order to detect gaps on the shelf modules 110 where products 112 should appear, but currently do not appear (i.e. indicating that a product may be out of stock). The resulting detected gaps can be provided to product status processing mechanisms (which may also be implemented by the processor 120 itself).

The processor 120 is interconnected with a non-transitory computer readable storage medium, such as a memory 122. The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The memory 122 stores computer readable instructions for performing various functionality, including control of the apparatus 103 to navigate the modules 110 and capture shelf data, as well as post-processing of the shelf data. The execution of the above-mentioned instructions by the processor 120 configures the server 101 to perform various actions discussed herein. The applications stored in the memory 122 include a gap detection application 124 (also simply referred to as the application 124). In general, via execution of the application 124 or subcomponents thereof and in conjunction with other components of the server 101, the processor 120 performs various actions to detect, in depth measurements representing the shelves 110 (e.g. data captured by the apparatus 103), gaps indicative of products 112 that are out of stock, for use in downstream processing to detect and act upon product status information.

Certain example components of the application 124 are shown in FIG. 1, including a label classifier 126. The label classifier 126 assigns classifications to label indicators received as input to the application 124. Specifically, the classifier 126 determines whether each label indicator corresponds to a shelf-mounted label or to a peg-mounted label. As will be apparent to those skilled in the art, the placement of products 112 relative to corresponding labels in the facility varies depending on whether the products 112 are supported on support surfaces 117 or on pegs. Classifying labels as peg or shelf labels enables the server 101 to select appropriate regions of the captured data associated with each label to detect gaps.

The application 124 also includes a search space generator to select the above-mentioned regions in which the server 101 is to search for gaps, and a gap detector 130 to determine whether gaps are present in the regions. In other embodiments, the application 124 may be implemented as a suite of logically distinct application, each implementing a suitable portion of the functionality discussed below. For example, the classifier 126, search space generator 128, and the gap detector 130 may be implemented as separate applications.

The memory 122 can also store data for use in the above-mentioned control of the apparatus 103, such as a repository 132 containing a map of the retail environment and any other suitable data (e.g. operational constraints for use in controlling the apparatus 103, data captured by the apparatus 103, and the like).

The processor 120, as configured via the execution of the control application 128, is also referred to herein as an imaging controller 120, or simply as a controller 120. As will now be apparent, some or all of the functionality implemented by the imaging controller 120 described below may also be performed by preconfigured special purpose hardware controllers (e.g. one or more logic circuit arrangements specifically configured to optimize the speed of image processing, for example via FPGAs and/or Application-Specific Integrated Circuits (ASICs) configured for this purpose) rather than by execution of the application 124 by the processor 120.

The server 101 also includes a communications interface 134 interconnected with the processor 120. The communications interface 134 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 134 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 134 for storage (e.g. in the repository 132) and subsequent processing (e.g. to detect product facings, as noted above). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
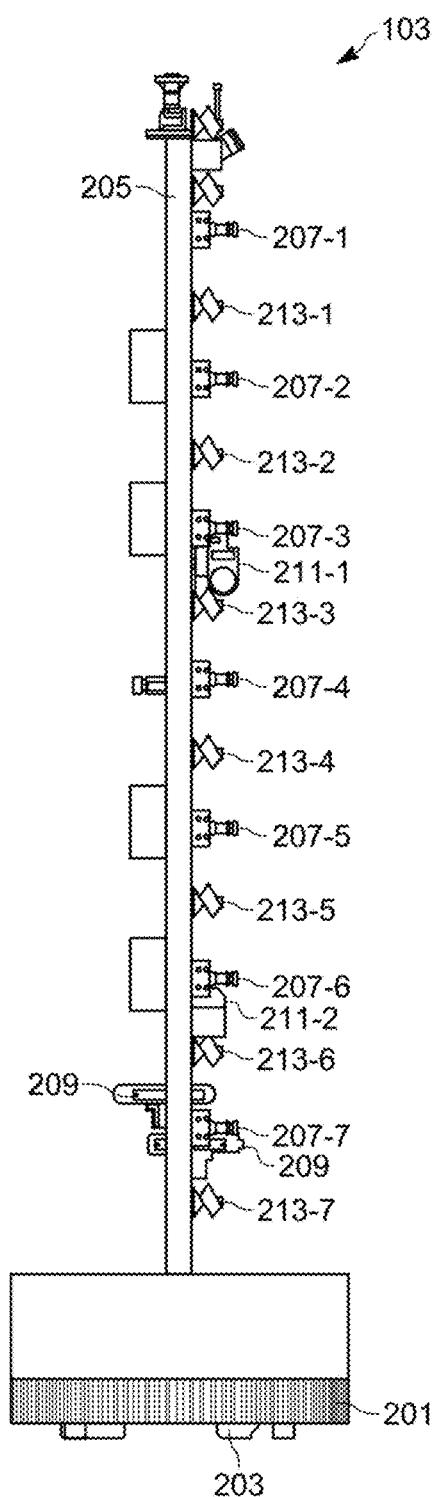
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. In other examples, the mast 205 can support additional LIDAR sensors 211 (e.g. four LIDARs 211). As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. That is, the illumination assembly 213-1 illuminates the field of view of the camera 207-1, and so on. The cameras 207 and LIDARs 211 are oriented on the mast 205 such that the fields of view of the sensors each face a shelf 110 along the length 119 of which the apparatus 103 is traveling. As noted earlier, the apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
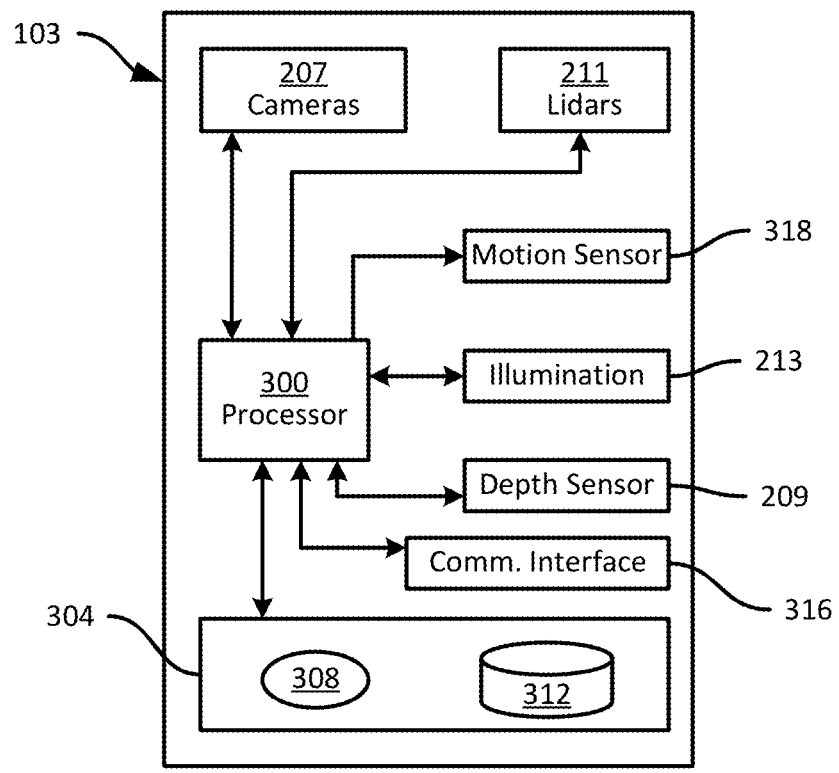
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, LIDARs 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores an apparatus control application 308 which, when executed by the processor 300, configures the processor 300 to perform various functions related to navigating the facility and controlling the sensors 108 to capture data, e.g. responsive to instructions from the server 101. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308. The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

In addition to the sensors mentioned earlier, the apparatus 103 includes a motion sensor 318, such as one or more wheel odometers coupled to the locomotive assembly 203. The motion sensor 318 can also include, in addition to or instead of the above-mentioned wheel odometer(s), an inertial measurement unit (IMU) configured to measure acceleration along a plurality of axes.

Figure 4:
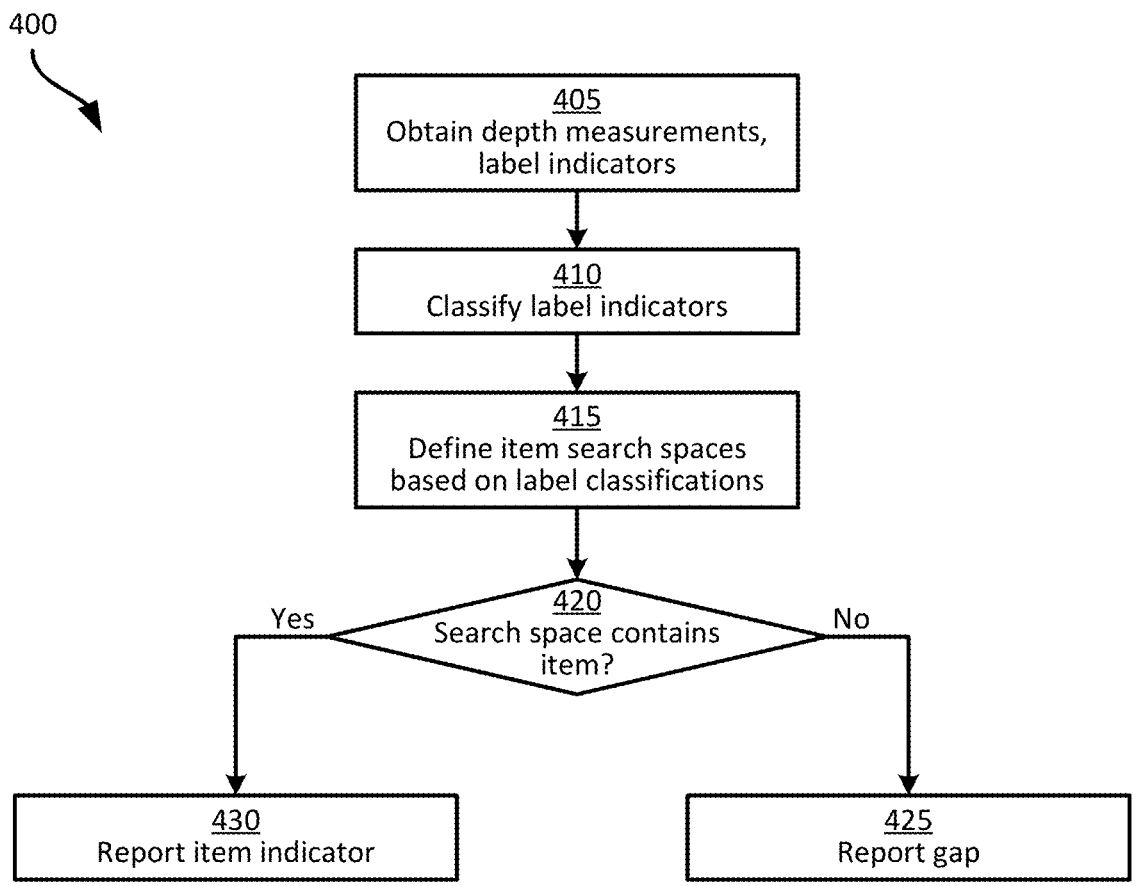
FIG. 4 is a flowchart of a method of detecting gaps on support structures in the system of FIG. 1.

The actions performed by the server 101, and specifically by the processor 120 as configured via execution of the application 124, to classify label indicators and detect gaps from captured data representing the shelves 110 (e.g. depth measurements captured by the apparatus 103) will now be discussed in greater detail with reference to FIG. 4. FIG. 4 illustrates a method 400 of detecting gaps. The method 400 will be described in conjunction with its performance in the system 100, and in particular by the server 101, with reference to the components illustrated in FIG. 1. As will be apparent in the discussion below, in other examples, some or all of the processing described below as being performed by the server 101 may alternatively be performed by the apparatus 103.

Beginning at block 405, the server 101 obtains a plurality of depth measurements (that is, a point cloud) representing a support structure such as one or more of the above-mentioned shelf modules 110. The depth measurements can be retrieved from the memory 122 (e.g. from the repository 132), having been previously stored at the server 101 following their receipt from the apparatus 103. The depth measurements represent the position, in three dimensions (e.g. according to the frame of reference 102), of a plurality of locations on the support structure.

The server 101 also obtains, at block 405, a plurality of label indicators. The label indicators define positions (e.g.

bounding boxes), also according to the frame of reference 102, of labels on the support structure depicted by the point cloud mentioned above. More specifically, the label indicators typically define bounding boxes indicating the extent of each label. The label indicators can be generated via a variety of mechanisms, whether at the server 101 itself or at another computing device. For example, the label indicators may be generated by detecting label features (e.g. barcodes, text, gradients and the like) in images captured by the apparatus 103.

Figure 5:
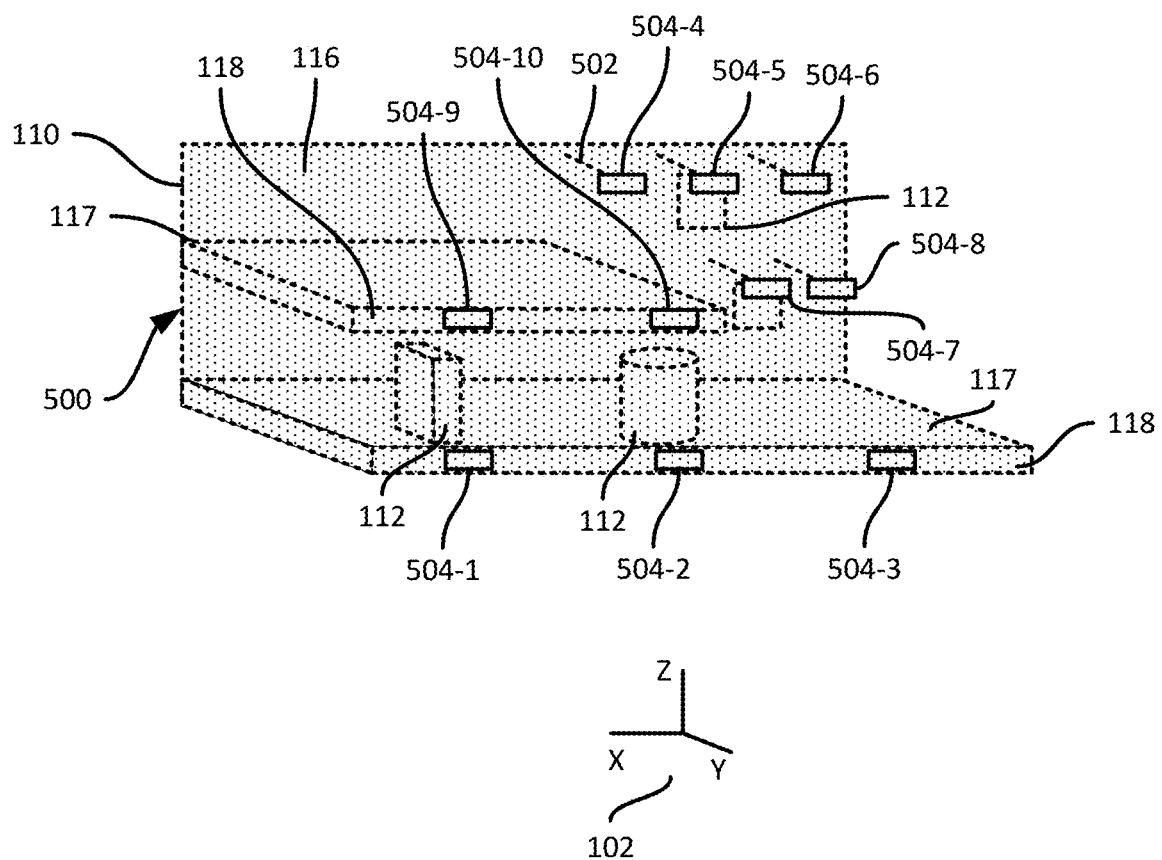
FIG. 5 is a diagram illustrating example input data to the method of FIG. 4.

Turning to FIG. 5, an example point cloud 500 is shown depicting a support structure that includes both support surfaces 117 (having shelf edges 118) and a number of pegs 502. As seen in FIG. 5, each peg 502 extends outwards from the shelf back 116, and one or more products 112 can be suspended from the peg 502. Also illustrated in FIG. 5 are label indicators 504. Specifically, label indicators 504-1, 504-2 and 504-3 indicate the positions of labels placed on a shelf edge 118, while label indicators 504-4, 504-5, 504-6, 504-7 and 504-8 indicate the positions of labels mounted at the ends of respective pegs 502. Each label is associated with a space on the corresponding support surface 117 or peg 502 that supports a given product, typically identified by the label itself. As seen in FIG. 5, some pegs 502 support products 112, while other pegs 502 are empty. Similarly, some portions of the shelf surface 117 support products 112, while others (such as the portion of the shelf surface 117 above the label indicator 504-3) are empty. Through the label classification and gap detection process discussed herein, the server 101 determines which pegs 502 and/or shelf regions are empty (i.e. which portions of the support structure have gaps where products 112 are expected).

Returning to FIG. 4, at block 410 the server 101, and in particular the label classifier 126, classifies the label indicators 504. Each label indicator 504 is classified as either a shelf label (i.e. corresponding to a label mounted on a shelf edge 118) or a peg label (i.e. corresponding to a label mounted on a peg 502). As will be discussed below, the label indicators 504 are classified based on subsets of the depth measurements, selected according to the location of the label indicators 504.

Figure 6:
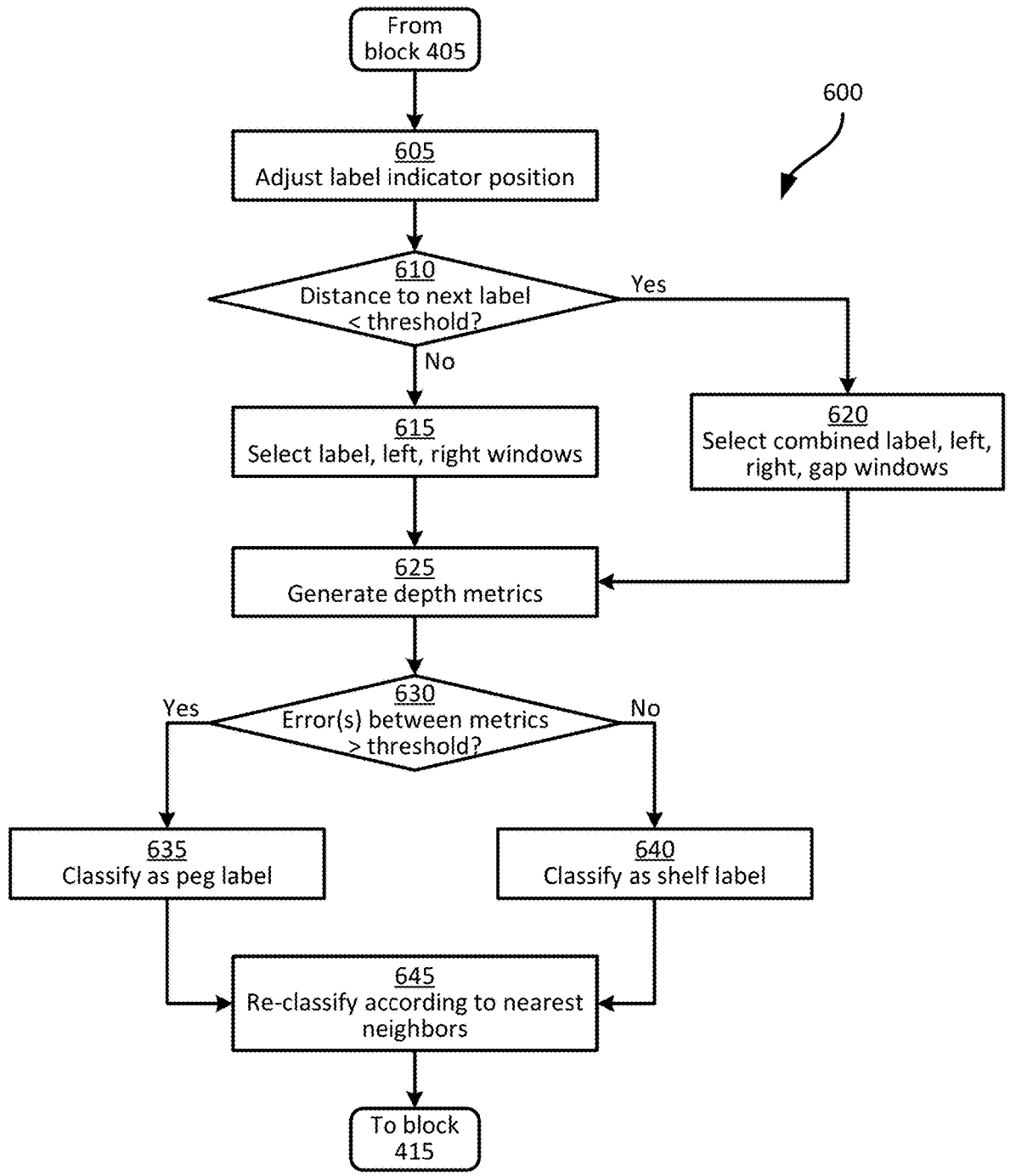
FIG. 6 is a flowchart of a method of performing block 410 of the method of FIG. 4.

Turning to FIG. 6, a method 600 of classifying label indicators 504 (i.e. of performing block 410 of the method 400) is illustrated. The method 600 is performed for each label indicator 504 obtained at block 405. Upon completion of the method 600 for every label indicator 504, the server 101 returns to the method 400 itself (specifically, to block 415).

At block 605, prior to beginning classification of the label indicators 504, the server 101 can perform one or more pre-processing actions on the label indicators 504. For example, the server 101 can remove erroneous label indicators 504 and/or adjust the position of the label indicator 504. Detection of labels, e.g. from image data as mentioned above, may occasionally result in minor positional errors, in which the label indicator 504 deviates to a degree from the actual label whose position it indicates. The server 101, at block 605, attempts to correct such deviations by generating a set of candidate adjusted label indicators 504. For example, eight candidate adjusted label indicators can be generated, each shifted in a different direction (e.g. left, left and up, up, right and up, right, right and down, down, left and down) by a predefined distance (e.g. 5 mm). The label classifier 126 then determines a variability measurement for the depth measurements within each candidate (as well as within the original indicator 504). That is, for each candidate, the label classifier 126 selects all depth measurements having coordinates on the X and Z axes (as shown in FIG. 5) that fall within the relevant candidate indicator. The variability measurement may be, for example, the standard deviation of the depth measurements. The label classifier 126 selects the one of the candidates or the original indicator 504 with the lowest variability. Low variability indicates that the candidate indicator encompasses a substantially flat surface (i.e. a label) rather than part of label and part of some other structure, such as a product 112, the shelf back 116, or the like.

Other pre-processing operations can also be performed at block 605. For example, the label classifier 126 may also discard any label indicators 504 with dimensions that exceed a configurable maximum threshold, as well as any label indicators 504 with dimensions that do not exceed a configurable minimum threshold. In another example, in some embodiments the label indicators received at block 405 may not yet have been checked for duplicate detections of the same physical labels. The label classifier 126 can therefore also determine whether each label indicator 504 overlaps with another label indicator 504 (e.g. with any degree of overlap, or meeting at least a minimum overlap threshold). Label indicators 504 that overlap sufficiently are combined into a single label indicator 504, either by discarding all but one of the overlapping indicators 504, computing a new label indicator centered at an average of the centers of the overlapping indicators 504, or the like. In other examples, block 605 may simply be omitted.

At block 610, the label classifier 126 determines whether the label indicator 504 being classified is located within a configurable threshold distance of an adjacent label indicator 504. Specifically, the distance assessed at block 610 is the distance to the adjacent label indicator 504 to the left and/or right (rather than to indicators 504 above or below the indicator 504 being processed). The threshold distance may be, for example, a distance equal to the expected width of a label in the facility where the point cloud 500 was captured. A wide variety of other threshold distances may also be applied, however. When the determination at block 610 is negative (i.e. the label indicator 504 is sufficiently spaced from its neighbors), performance of the method 600 proceeds to block 615. When the determination at block 610 is affirmative, performance of the method 600 proceeds to block 620. Blocks 615 and 620 will be discussed below, with reference to FIG. 7.

Figure 7:
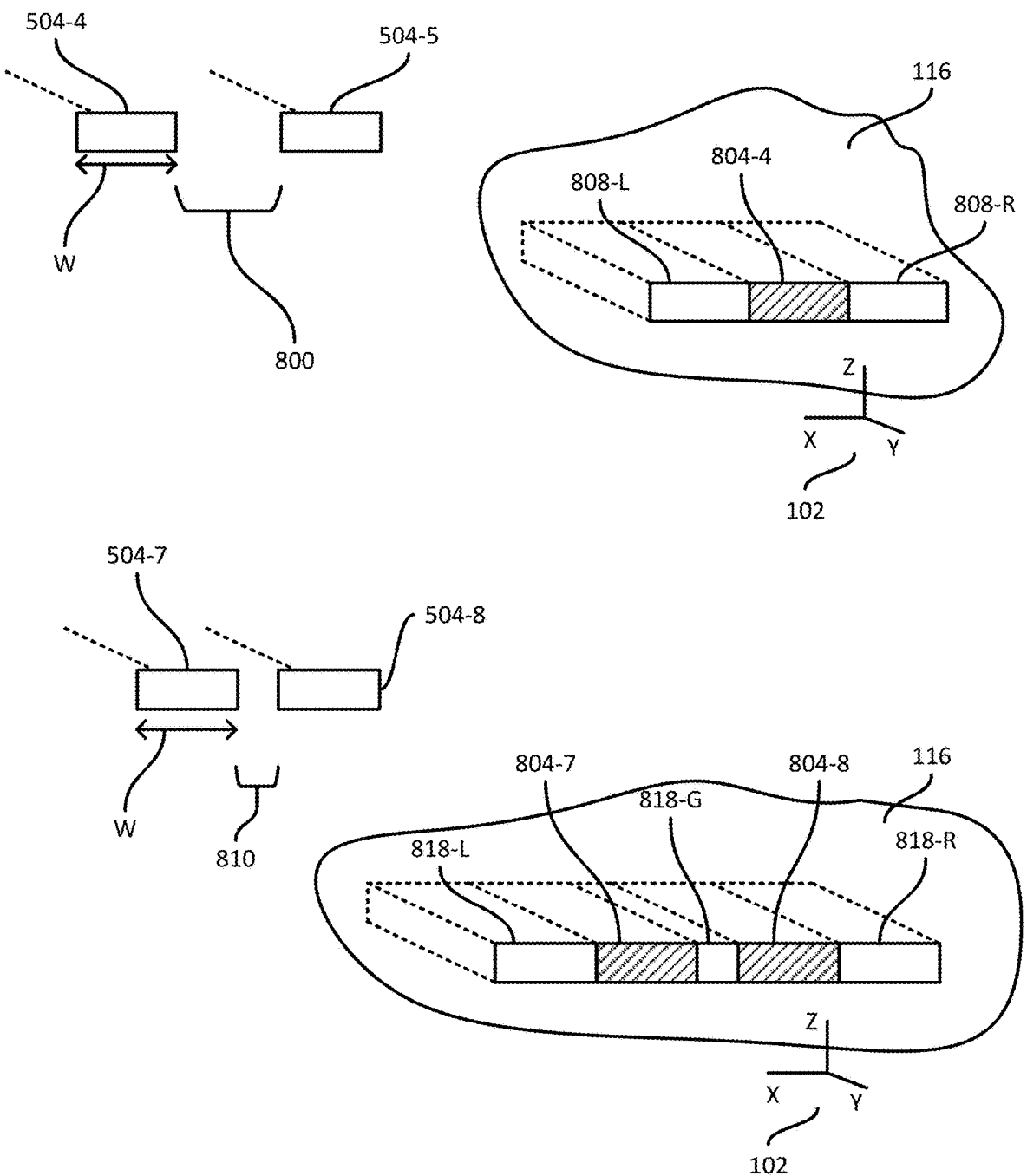
FIG. 7 is a diagram illustrating performances of blocks 610, 615 and 620 of the method of FIG. 6.

FIG. 7 illustrates an example performance of block 615, and an example performance of block 620. In the first example, during the processing of the label indicator 504-4, the label classifier 126 identifies the label indicator 504-5 as the nearest neighbor to the left or right (as seen in FIG. 5, the label indicator 504-4 has no indicators to the left). The label classifier 126 determines the distance 800 between the indicators 504-4 and 504-5, and compares the distance 800 to a threshold, such as the width W of the indicator 504-4 itself. The width W is smaller than the distance 800, and the label classifier 126 therefore proceeds to block 615. At block 615, the label classifier 126 selects depth measurements according to a label window 804-4, as well as left and right neighboring windows 808-L and 808-R. The window 804-4 has the same size and location as the label indicator 504-4, and the windows 808-L and 808-R have the same size as the label indicator 504-4, but locations that are immediately adjacent to the label indicator 504-4.

Each of the windows 804 and 808, as seen in FIG. 7, defines a column extending from the window itself to the shelf back 116. Thus, the label classifier 126 is configured to select three subsets of the depth measurements at block 615:

one subset contained in the column defined by the window 808-L, and additional subsets contained in the columns defined by the windows 804-4 and 808-R.

The lower section of FIG. 7 illustrates the assessment at block 610 for the label indicator 504-7. As illustrated, a distance 810 between the label indicator 504-7 and the label indicator 504-8 is smaller than the width W, and the determination at block 610 is therefore negative. If windows were selected for the label indicator 504-7 in the same way as illustrated for block 615, the right neighboring window would include a substantial portion of the depth measurements within the label indicator 504-8. As will be discussed below, the classification of label indicators 504 is based on differences in depth between the label indicator 504 and the surrounding area. Specifically, peg labels are expected to have substantially different depths than their surrounding areas, while shelf labels are expected to have substantially the same depth as their surrounding areas (because such surrounding areas are expected to contain shelf edges 118). Closely-spaced label indicators 504, such as the indicators 504-7 and 504-8, are therefore vulnerable to being may be mis-classified as shelf labels.

To mitigate such mis-classification, at block 620, the label classifier 126 selects four subsets of depth measurements rather than the above-mentioned three subsets. In particular, the label classifier 126 selects a label subset that consists of two columns of depth measurements, defined by label windows 804-7 and 804-8. The label classifier 126 also selects a left window 818-L adjacent to the window 804-7, and a right window 818-R adjacent to the window 804-8. Finally, the label classifier selects a gap window 818-G between the windows 804-7 and 804-8. In other words, the subsets selected at block 620 result in both of the adjacent label indicators 504 being processed simultaneously, and also in the selection of a smaller window 818-G between the windows 804-7 and 804-8. The performance of block 620 may also encompass more than two adjacent label indicators 504.

Returning to FIG. 6, at block 625 the label classifier 126 generates a depth metric for each of the selected subsets of depth measurements (i.e. each of the windows 804, 808, 818 discussed above). In the present example, the depth metrics are one-dimensional vectors. Specifically, a depth vector is generated at block 625 for each selected window. The depth vector for a given window contains one or more depth-related measurements derived from the depth measurements within that window. Examples of such measurements are (a) a number of depth measurements in the window, (b) a minimum depth represented in the window, (c) a maximum depth represented in the window, (d) a mean of the depth measurements in the window, (e) a first quartile depth in the window, (f) a third quartile depth in the window, (g) a median of the depth measurements in the window, (h) a range (i.e. a difference between the above-mentioned minimum and maximum depths), and (i) a standard deviation.

At block 630, the label classifier 126 compares the metrics generated at block 625 by generating error measurements between various pairs of the metrics. When block 615 was performed, an error measurement is generated between the metric for the left window (e.g. 808-L) and the label window (e.g. 804-4), and another error measurement is generated between the metric for the label window and the right window (e.g. 808-R). The error measurement may be, for example, a root-mean-square error (RMSE) value computed for each of the above-mentioned pairs.

When block 620 was performed, three error measurements are generated. The error measurements include a first error measurement between the metric for the label windows (e.g. 804-7 and 804-8) and the metric for the left window (e.g. 818-L) and a second error measurement between the metric for the label windows and the metric for the right window (e.g. 818-R). The error measurements also include a third error measurement between the metric for the label windows and the metric for the gap window (e.g. 818-G).

The determination at block 630 is affirmative when all of the above-mentioned error measurements exceed a configurable threshold. As will now be apparent, error measurements that exceed the threshold indicate substantially different depth profiles between the various windows, which in turn indicates that the area surrounding the label indicator 504 (or plural indicators 504, in the case of block 620) is in a substantially different plane than the label indicator 504 itself. The label indicator 504 is therefore likely to represent a peg label, and is classified as a peg label at block 635. When at least one of the above-mentioned error measurements does not exceed the threshold, the determination at block 630 is negative, and the label indicator 504 is classified as a shelf label at block 640.

At block 645, the label classifier 126 can optionally reclassify each label indicator 504, once all label indicators 504 have been classified, based on the nearest neighbors of the label indicator 504. The performance of block 645 reflects an assumption that peg labels tend to be grouped together, as do shelf labels. That is, it is assumed to be unlikely that a sole peg label is surrounded by shelf labels. Therefore, at block 645 the classes of the nearest neighbors (e.g. one to three neighbors to the left, and one to three neighbors to the right) of an indicator 504 can be retrieved, and the label indicator can be reclassified with the class of the majority of the neighboring indicators 504. In other examples, however, block 645 can be omitted.

Following completion of the method 600 for each label indicator 504, the server 101 returns to the method 400 (specifically, to block 415). At block 415, the search space generator 128 defines item search spaces for each label indicator 504, based on the class assigned to the label indicator 504 at block 410. The item search spaces defined at block 415 represent, for each label indicator 504, a region in the point cloud 500 in which a product 112 corresponding to the label indicator 504 is expected to appear. The location of a given product 112 relative to the corresponding label, however, varies depending on the nature of the support structure where the product 112 and the label are located.

Specifically, as noted earlier, pegs 502 support labels at the ends thereof and support products 112 underneath the pegs 502. That is, products 112 are typically expected to appear below the corresponding label indicators 504 when the label indicators 504 are classified as peg labels. Shelf labels, on the other hand, are supported on shelf edges 118, and the corresponding products appear on the support surface 117 immediately above the shelf edge 118. Products 112 are therefore expected to appear above the corresponding label indicators 504 when the label indicators 504 are classified as shelf labels.

Figure 8:
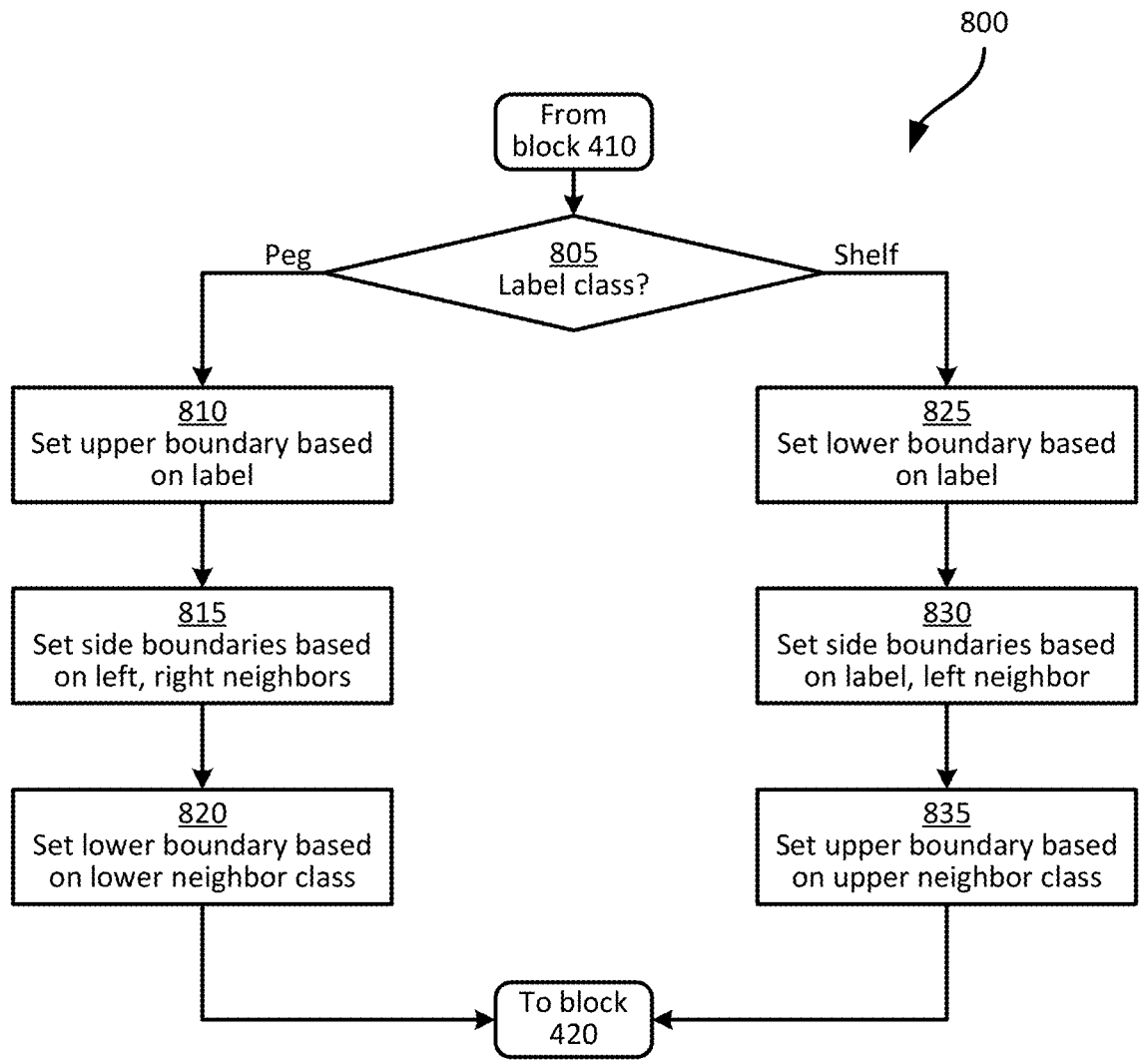
FIG. 8 is a flowchart of a method of performing block 415 of the method of FIG. 4.

Turning to FIG. 8, a method 800 of generating item search spaces (i.e. of performing block 415 of the method 400) is illustrated. The method 800 is performed for each label indicator 504. The search space generator 128 determines, at block 805, whether the label indicator 504 is classified as a shelf label or a peg label. When the label indicator is classified as a peg label, the search space generator 128 defines boundaries of a search space for the label indicator at blocks 810, 815 and 820, which need not be performed in the order shown in FIG. 8.

Figure 9:
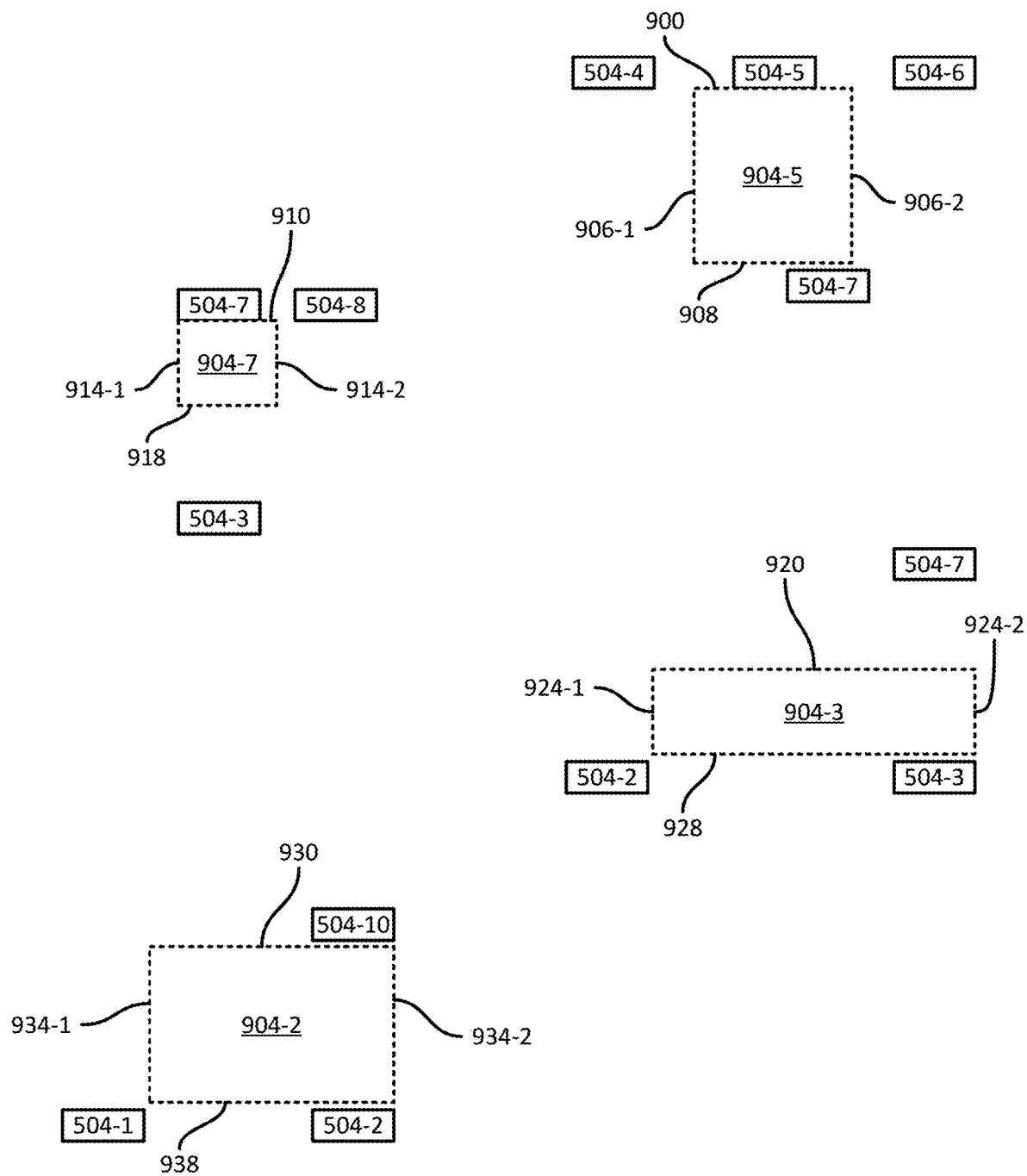
FIG. 9 is a diagram illustrating example performances of the method of FIG. 8.

At block 810, an upper boundary is defined based on the label indicator itself. In particular, as shown in FIG. 9, upper boundaries for peg labels are placed in line with the lower edge of the label indicator 504. Thus, an upper boundary 900 of a search space 904-5 corresponding to the label indicator 504-5 is in line with the lower edge of the label indicator 504-5. Similarly, an upper boundary 910 of a search space 904-7 corresponding to the label indicator 504-7 is in line with the lower edge of the label indicator 504-7.

Returning to FIG. 8, at block 815 side boundaries are defined based on the left and right neighbors of the label indicator 504. In particular, as shown in FIG. 9, side boundaries 906-1 and 906-2 of the search space 904-5 are placed at a predefined fraction (half-way, in the present example) of the distance between the label indicator 504-5 and neighboring label indicators 504-4 and 504-6. A side boundary 914-2 of the search space 904-7 is assigned in a similar manner. The opposing side boundary 914-1 of the search space 904-7, however, is placed in line with the left edge of the label indicator 504-7, because the label indicator 504-7 does not have a neighboring label indicator 504 to the left. In other embodiments, in the absence of the relevant neighbor boundaries may be placed according to various other criteria (e.g. at a predefined distance from the corresponding side of the label indicator 504).

At block 820, a lower boundary is defined according to the classification of the nearest label indicator 504 below (i.e. the lower neighbor) the label indicator 504 being processed. Specifically, the lower boundary is placed in line with the upper edge of the lower neighbor if the lower neighbor is a peg label, or at a predefined fraction of a distance between the label indicator 504 and the lower neighbor, if the lower neighbor is a shelf label. Referring again to FIG. 9, a lower boundary 908 of the search space 904-5 is placed in line with the upper edge of the label indicator 504-7. The label indicator 504-7 is the lower neighbor of the label indicator 504-5, and is classified as a peg label. In contrast, a lower boundary 918 of the search space 904-7 is placed half-way between the label indicator 504-7 and the lower neighbor of the label indicator 504-7, which is classified as a shelf label.

When the label indicator 504 for which a search space is to be generated is a shelf label, the boundaries of the search space are generated by the search space generator 128 according to blocks 825, 830 and 835 (although as noted above, blocks 825, 830 and 835 need not be performed in the order shown).

At block 825, a lower boundary of the search space is generated based on the label indicator 504. In particular, referring to FIG. 9, the lower boundary is placed in line with the upper edge of the label indicator 504. For example, lower boundaries 928 and 938 of the search spaces 904-3 and 904-2, respectively, are placed in line with the upper edges of the label indicators 504-3 and 504-2. At block 830, side boundaries are placed based on the label indicator 504 itself, and on the left-hand neighbor label indicator 504. Turning again to FIG. 9, right boundaries 924-2 and 934-2 of the search spaces 904-3 and 904-2, respectively, are placed in line with the right-hand edges of the label indicators 504-3 and 504-2. Left boundaries 924-1 and 934-1, on the other hand, are placed in line with the right edges of the neighboring label indicators 504-2 and 504-1, respectively. Finally, at block 835 an upper boundary is generated based on the classification of the upper neighbor (i.e. the nearest label indicator 504 above the label indicator 504 being processed via the method 800).

Referring once again to FIG. 9, the upper neighbor of the label indicator 504-3 (the label indicator 504-7) is a peg label, and an upper boundary 920 of the search space 904-3 is therefore placed at a predefined fraction (e.g. half-way) of the distance between the label indicators 504-3 and 504-7. The upper neighbor of the label indicator 504-2, on the other hand (the label indicator 504-10), is classified as a shelf label. An upper boundary 930 of the search space 904-2 is therefore placed at the lower edge of the label indicator 504-10.

Figure 10:
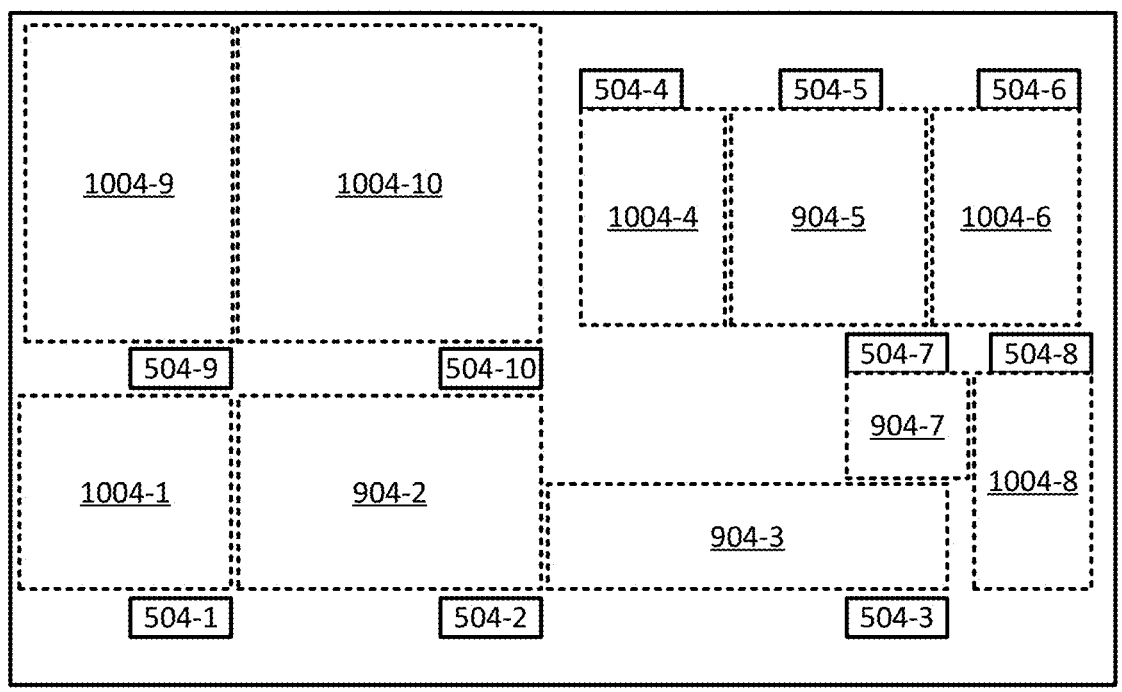
FIG. 10 is a diagram illustrating a set of results from the method of FIG. 8.

FIG. 10 illustrates a set of search spaces generated via the method 800 for each of the label indicators 504. In addition to the search spaces 904 mentioned above, FIG. 10 illustrates search spaces 1004-1, 1004-4-, 1004-6, 1004-8, 1004-9 and 1004-10. As will be apparent in FIG. 10, certain search spaces (e.g. the search spaces 1004-1 and 1004-9) extend to the boundaries of the shelf module 110 itself, when the relevant neighboring label indicators 504 are not present. When the search spaces for each label indicator 504 have been generated via the method 800, performance of the method 400 continues at block 420.

Returning to FIG. 4, at block 420 the gap detector 130 determines, based on the depth measurements within the search space for each label indicator 504, whether an item (i.e. a product 112, in the illustrated example) is present in the search space corresponding to that label indicator 504. Various mechanisms are contemplated for performing block 420. In some examples, at block 420 the gap detector 130 generates a depth metric such as the previously mentioned depth vector, based on the depth measurements within the search space. The gap detector 130 can then determine a magnitude of the depth vector (e.g. by computing the norm of the depth vector) and compare the magnitude to a predefined threshold. A depth vector for a search space that does not contain any products 112 typically has greater minimum and maximum depths, greater mean and median depths, and greater first and third quartile depths, than a depth vector for a search space that does contain products 112. Therefore, if the norm of the depth vector exceeds the threshold, the determination at block 420 is negative (i.e. the search space does not contain any products 112). Following a negative determination at block 420, the gap detector 130 reports a gap at block 425. For example, the gap detector 130 can generate a gap indicator defining a location in the frame of reference 102 of the detected gap. The location may, for example, be defined by the same bounding box as the search space evaluated at block 420.

When the determination at block 420 is affirmative (i.e. when the above-mentioned depth vector does not exceed the threshold), the gap detector proceeds to block 430. At block 430, the gap detector 130 may report an item indicator. The item indicator may include a bounding box equivalent to the search space, and may also include the depth vector.

Figure 11:
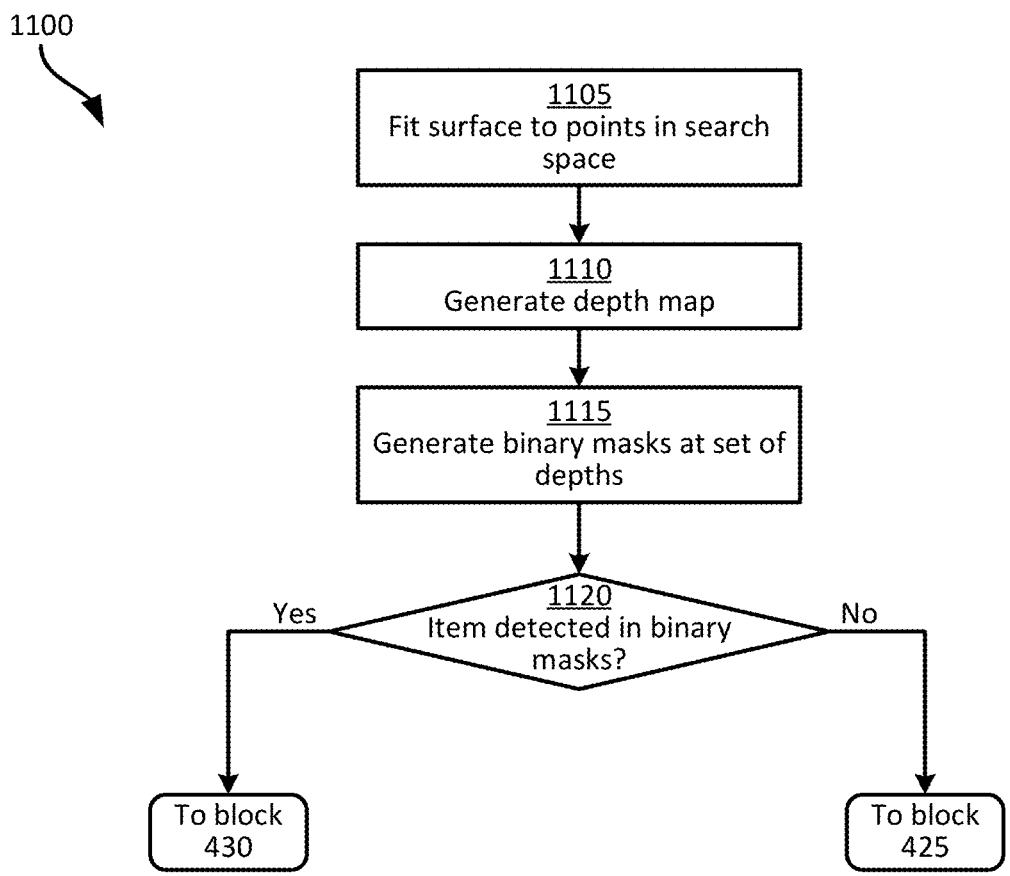
FIG. 11 is a flowchart of a method of performing block 420 of the method of FIG. 4.

In other embodiments, the gap detector 130 can perform a segmentation operation on the depth measurements in the search space to identify items (e.g. products 112) therein. FIG. 11 illustrates a method 1100 of performing block 420 in such embodiments. At block 1105, the gap detector 130 can fit a three-dimensional surface to the depth measurements in the search space, according to any suitable surface-fitting operation (e.g. a mesh-based interpolation operation). In some examples, block 1105 can be omitted, e.g. if the search space contains a minimum density of depth measurements.

Figure 12:
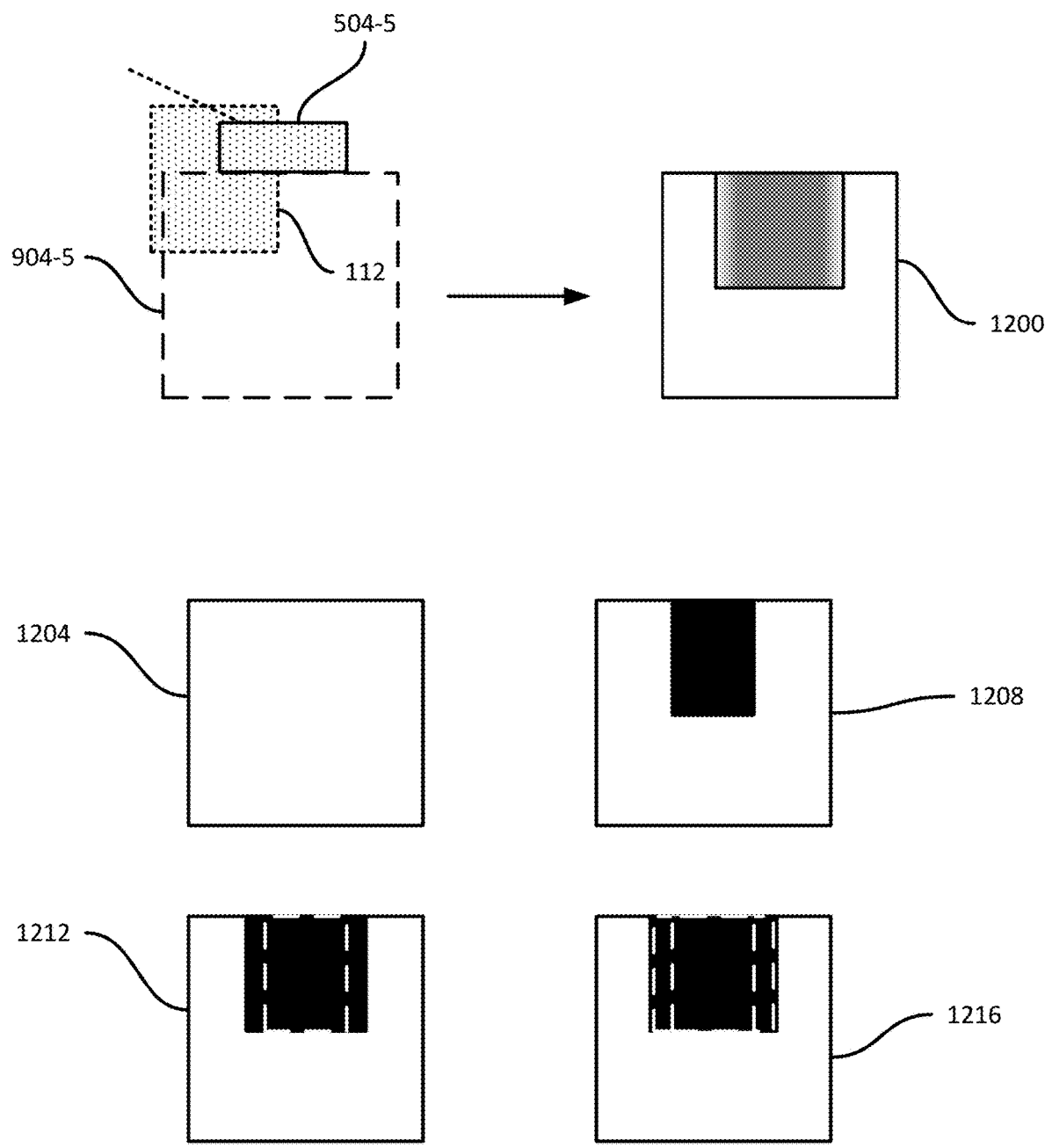
FIG. 12 is a diagram illustrating a performance of the method of FIG. 11.

At block 1110 the gap detector 130 generates a two-dimensional depth map from the surface of block 1105 (or directly from the depth measurements in the search space, if block 1105 is omitted). The depth map projects the depth measurements, or portions of the fitted surface, to two dimensions and assigns an intensity value to each portion or depth measurement based on the depth of that portion or depth measurement. FIG. 12 illustrates a depth map 1200 generated from the depth measurements in the search space 904-5.

At block 1115, the gap detector 130 generates a plurality of binary masks from the depth map, by applying a series of intensity thresholds (which are therefore effectively depth thresholds) to the depth map. For each intensity threshold, all pixels in the depth map with intensities below the threshold (i.e. representing greater depths) are given a first intensity in the binary mask, while all remaining pixels are given a second intensity in the binary mask. The intensity thresholds are selected, for example, as fractions of a maximum depth in the search space. For example, a series of intensity thresholds can be generated from 95% of the maximum depth to 50% of the maximum depth, at 5% intervals. A wide variety of other series of intensity thresholds may also be employed, however.

FIG. 12 illustrates a set of four binary masks 1204, 1208, 1212 and 1216. The binary mask 1204 corresponds to an intensity threshold of 50% of the maximum depth in the search space 904-5. The maximum depth is the depth of the shelf back 116, and in the illustrated example it is assumed that 50% of the maximum depth is in front of the product 112. Therefore, no pixels in the depth map 1200 are below the threshold, and the binary mask 1204 consists entirely of "zero" pixels, indicating that no item is present.

The masks 1208, 1212 and 1216 correspond to progressively greater thresholds (e.g. terminating at 95% of the maximum depth). Each binary mask therefore includes a region (shown in black) of high intensity, corresponding to pixels in the depth map with intensities below the corresponding threshold. The gap detector 130, for each binary mask, determines whether any contiguous regions of high intensity are present, according to any suitable blob detection operation. Such contiguous regions represent potential items (e.g. products 112) within the search space.

At block 1120, the gap detector 130 determines whether the contiguous regions detected in the binary masks indicate the present of a product 112. The gap detector 130 can, for example, determine whether any of the regions satisfies dimensional criteria such as a minimum width and/or a minimum height. The gap detector 130 can also determine whether any of the regions satisfies a detection criterion, such as a minimum number of overlapping regions from adjacent binary masks. Turning to FIG. 12, it is apparent that the masks 1208, 1212 and 1216 each contain overlapping regions (the region from the mask 1208 is shown in dashed white lines in the mask 1212, and the regions from the masks 1208 and 1212 are shown in dashed white lines in the mask 1216). Thus, the regions in the masks 1208, 1212 and 1216 likely correspond to the same physical item, which has therefore been detected in three masks.

When the determination at block 1120 is affirmative, the gap detector 130 proceeds to block 430 as discussed above. When the determination at block 1120 is negative, on the other hand, the gap detector 130 proceeds to block 425 as discussed above.

The server 101 is enabled, via the methods discussed above, to distinguish between portions of a support structure that suspend products 112 from pegs 502, and portions of the support structure that support products 112 on surfaces 117. The server 101 is further enabled to determine, based on the above distinction, to define search spaces in which to search for products 112 and return either item indicators or gap indicators accordingly. The item or gap indicators are stored in the memory 122 (e.g. in the repository 132) for use in further processing, e.g. to out-of-stock generate alerts for transmission to the client device 104. The item or gap indicators may also be transmitted to other computing devices, presented on a display connected to the server 101, or the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting gaps on a support structure, the method comprising:
   obtaining, at an imaging controller, (i) a plurality of depth measurements representing the support structure according to a common frame of reference, and (ii) a plurality of label indicators each defining a boundary of a label mounted on either a peg or a shelf edge of the support structure in the common frame of reference;
   for each of the label indicators:
      assigning, to the label indicator, either a peg-mounted label class or a shelf edge-mounted label class, based on a first portion of the depth measurements within the boundary, and a second portion of the depth measurements outside the boundary and adjacent to the boundary;
      generating an item search space in the common frame of reference according to the class of the label indicator; and
      determining, based on a subset of the depth measurements within the item search space, whether the item search space contains an item.

2. The method of claim 1, further comprising: when the determination is negative, generating a gap indicator in association with the label indicator.

3. The method of claim 1, wherein assigning a class to the label indicators comprises:
   selecting, as the second portion of the depth measurements, neighbor windows on either side of the label boundary;
   generating depth metrics for each of the first portion of the depth measurements and the neighbor windows;
   when error measurements between the first portion depth metric and each of the neighbor window depth metrics exceed a threshold, classifying the label indicator as a peg label; and
   otherwise, classifying the label indicator as a shelf label.

4. The method of claim 1, wherein classifying the label indicators comprises:
   identifying a pair of adjacent label indicators separated by a distance below a distance threshold;
   selecting, as the first portion of the depth measurements, (i) label windows corresponding to the interiors of the boundaries of each of the pair, (ii) neighbor windows on either side of the boundaries of the pair, and (iii) a gap window between the boundaries of the pair;
   generating a single depth metric for the label windows;
   generating depth metrics for each of the neighbor windows and the gap window;
   when error measurements between the single depth metric and each of the neighbor window depth metric and the gap widow depth metric exceed a threshold, classifying the label indicator as a peg label; and
   otherwise, classifying the label indicator as a shelf label.

5. The method of claim 3, wherein the depth metric is a vector containing at least one of: a number of depth measurements, a minimum depth, a maximum depth, a mean depth, a first quartile depth, a third quartile depth, a median depth, a depth range, and a standard deviation.

6. The method of claim 5, wherein the error measurements are root-mean square errors (RMSEs).

7. The method of claim 1, wherein generating the item search space includes, when the label indicator us classified as a peg label:
   setting side boundaries based on left and right neighbor label indicators;
   setting an upper boundary below the label indicator; and
   setting a lower boundary according to a class of a lower neighbor label indicator.

8. The method of claim 1, wherein generating the item search space includes, when the label indicator is classified as a shelf label:
   setting side boundaries based on the label indicator and a neighbor label indicator;
   setting an upper boundary according to a class of an upper neighbor label indicator; and
   setting a lower boundary based on the label indicator.

9. The method of claim 1, wherein determining whether the item search space contains an item comprises:
   generating a depth metric from the depth measurements within the item search space;
   when the metric meets a threshold, determining that the item search space contains an item; and
   when the metric does not meet a threshold, determining that the item search space contains a gap.

10. The method of claim 1, wherein determining whether the item search space contains an item comprises:
    generating a depth map from the depth measurements within the item search space;
    generating a set of binary masks from the depth map; and
    detecting the presence or absence of an item based on the binary masks.

11. A computing device comprising:
    a memory storing (i) a plurality of depth measurements representing a support structure according to a common frame of reference, and (ii) a plurality of label indicators each defining a boundary of a label position mounted on either a peg or a shelf edge of the support structure in the common frame of reference;

an imaging controller configured, for each of the label indicators, to:
   assign, to the label indicator, either a peg-mounted label class or a shelf edge-mounted label class, based on a first portion of the depth measurements within the boundary, and a second portion of the depth measurements outside the boundary and adjacent to the boundary;
   generate an item search space in the common frame of reference according to the class of the label indicator; and
   determine, based on a subset of the depth measurements within the item search space, whether the item search space contains an item.

12. The computing device of claim 11, wherein the imaging controller is further configured to: when the determination is negative, generate a gap indicator in association with the label indicator.

13. The computing device of claim 11, wherein the imaging controller is further configured, in order to classify assign a class to the label indicators, to:
   select, as the second portion of the depth measurements, neighbor windows on either side of the label boundary;
   generate depth metrics for each of the first portion of the depth measurements and the neighbor windows;
   when error measurements between the first portion depth metric and each of the neighbor window depth metrics exceed a threshold, classify the label indicator as a peg label; and
   otherwise, classify the label indicator as a shelf label.

14. The computing device of claim 11, wherein the imaging controller is further configured, in order to classify the label indicators, to:
   identify a pair of adjacent label indicators separated by a distance below a distance threshold;
   select, as the first portion of the depth measurements, (i) label windows corresponding to the interiors of the boundaries of each of the pair, (ii) neighbor windows on either side of the boundaries of the pair, and (iii) a gap window between the boundaries of the pair;
   generate a single depth metric for the label windows;
   generate depth metrics for each of the neighbor windows and the gap window;
   when error measurements between the single depth metric and each of the neighbor window depth metric and the gap widow depth metric exceed a threshold, classify the label indicator as a peg label; and
   otherwise, classify the label indicator as a shelf label.

15. The computing device of claim 13, wherein the depth metric is a vector containing at least one of a number of depth measurements, a minimum depth, a maximum depth, a mean depth, a first quartile depth, a third quartile depth, a median depth, a depth range, and a standard deviation.

16. The computing device of claim 15, wherein the error measurements are root-mean square errors (RMSEs).

17. The computing device of claim 11, wherein the imaging controller is further configured, in order to generate the item search space, when the label indicator us classified as a peg label, to:
   set side boundaries based on left and right neighbor label indicators;
   set an upper boundary below the label indicator; and
   set a lower boundary according to a class of a lower neighbor label indicator.

18. The computing device of claim 11, wherein the imaging controller is further configured, in order to generate the item search space, when the label indicator us classified as a shelf label, to:
   set side boundaries based on the label indicator and a neighbor label indicator;
   set an upper boundary according to a class of an upper neighbor label indicator; and
   set a lower boundary based on the label indicator.

19. The computing device of claim 11, wherein the imaging controller is further configured, in order to determine whether the item search space contains an item, to:
   generate a depth metric from the depth measurements within the item search space;
   when the metric meets a threshold, determine that the item search space contains an item; and
   when the metric does not meet a threshold, determine that the item search space contains a gap.

20. The computing device of claim 11, wherein the imaging controller is further configured, in order to determine whether the item search space contains an item, to:
   generate a depth map from the depth measurements within the item search space;
   generate a set of binary masks from the depth map; and
   detect the presence or absence of an item based on the binary masks.

* * * * *